United States Patent [19]
Dundas

[11] Patent Number: 5,664,471
[45] Date of Patent: Sep. 9, 1997

[54] APPARATUS FOR TRIMMING THE NECK OF BLOW MOLDED PLASTIC BOTTLES AND METHOD

[75] Inventor: Dennis L. Dundas, Dover, Pa.

[73] Assignee: Graham Engineering Corporation, York, Pa.

[21] Appl. No.: 546,190

[22] Filed: Oct. 20, 1995

[51] Int. Cl.⁶ .................. B26D 7/02; B26D 5/08
[52] U.S. Cl. .................. 83/24; 83/681; 83/914; 264/536; 425/527; 425/806
[58] Field of Search .................. 83/946, 914, 681, 83/682, 100, 111, 54, 24; 264/536; 425/806, 527

[56] References Cited

U.S. PATENT DOCUMENTS

| | | | |
|---|---|---|---|
| 638,711 | 12/1899 | Higgins | 83/188 |
| 1,582,052 | 4/1926 | Klages | 83/49 |
| 1,941,316 | 12/1933 | Patzer | 83/578 |
| 2,060,888 | 4/1936 | Newman | 83/660 |
| 2,670,795 | 3/1954 | Griep | 83/185 |
| 2,818,924 | 1/1958 | Lang | 83/685 |
| 2,890,483 | 6/1959 | Soubier | 225/102 X |
| 2,988,776 | 6/1961 | Schaich | 83/563 X |
| 3,009,198 | 11/1961 | Kalman et al. | 425/296 |
| 3,025,562 | 3/1962 | Nelson | 425/531 |
| 3,032,809 | 5/1962 | Willard | 264/533 |
| 3,120,143 | 2/1964 | Kreider | 83/454 |
| 3,127,636 | 4/1964 | Heider | 264/533 |
| 3,145,243 | 8/1964 | Hagen | 264/536 |
| 3,164,646 | 1/1965 | Fischer | 264/526 |
| 3,209,401 | 10/1965 | Mehnert | 425/525 |
| 3,224,038 | 12/1965 | Budesheim | 425/531 |
| 3,268,641 | 8/1966 | King | 264/531 |
| 3,272,896 | 9/1966 | Winchester, Jr. | 264/533 |
| 3,278,665 | 10/1966 | Harrison | 264/529 |
| 3,295,347 | 1/1967 | Fuessle et al. | 72/55 |
| 3,314,106 | 4/1967 | Latrielle et al. | 425/525 |
| 3,340,569 | 9/1967 | Hagen | 425/532 |
| 3,351,981 | 11/1967 | Rupert | 425/292 |
| 3,363,282 | 1/1968 | Hagen et al. | 425/216 |
| 3,369,272 | 2/1968 | Martin, Jr. et al. | 425/525 |
| 3,391,588 | 7/1968 | Brown | 83/24 |
| 3,404,594 | 10/1968 | Dollenmayer | 83/587 |
| 3,411,387 | 11/1968 | Bailey | 83/30 |
| 3,417,428 | 12/1968 | Rupert | 425/527 |
| 3,429,211 | 2/1969 | Pelot | 82/46 |
| 3,454,690 | 7/1969 | Anderson et al. | 264/98 |
| 3,465,931 | 9/1969 | Rupert | 225/1 |
| 3,469,076 | 9/1969 | Saslawsky | 219/383 |
| 3,470,582 | 10/1969 | Martin, Jr. | 425/525 |
| 3,487,501 | 1/1970 | Siard et al. | 425/527 |
| 3,494,520 | 2/1970 | Bewalda, Jr. et al. | 225/94 |
| 3,540,371 | 11/1970 | Rome et al. | 101/38 |
| 3,562,372 | 2/1971 | Schjeldahl et al. | 264/94 |
| 3,584,338 | 6/1971 | Fischer et al. | 425/190 |
| 3,597,793 | 8/1971 | Weiler et al. | 18/5 |
| 3,608,021 | 9/1971 | Ziegler | 264/98 |
| 3,657,406 | 4/1972 | Delebarre | 264/98 |
| 3,736,091 | 5/1973 | Reilly | 425/326 |
| 3,737,273 | 6/1973 | Conner | 425/326 |
| 3,762,263 | 10/1973 | Bocceda | 83/660 |
| 3,769,394 | 10/1973 | Latrielle | 264/98 |
| 3,772,946 | 11/1973 | Sarra | 83/914 X |
| 3,783,724 | 1/1974 | Uhlig | 83/140 |
| 3,791,245 | 2/1974 | Eggert | 83/370 |
| 3,796,531 | 3/1974 | Bowers | 425/387 |
| 3,806,300 | 4/1974 | Hafele et al. | 425/387 |
| 3,821,344 | 6/1974 | Peters | 264/94 |

(List continued on next page.)

Primary Examiner—Rinaldi I. Rada
Assistant Examiner—Elizabeth Stanley
Attorney, Agent, or Firm—Thomas Hooker, P.C.

[57] ABSTRACT

An apparatus for trimming a ring from the neck of a blow molded plastic bottle includes a reverse punch for cutting a ring from the neck and positioning the ring on the punch shaft and a ring stripper for cutting one side of the ring on the punch shaft and pulling the other side of ring from the shaft. The ring stripper includes a hook for engaging the ring and pulling the ring against a blade. The blade severs the ring and the hook then strips the severed ring from the shaft for disposal.

25 Claims, 6 Drawing Sheets

U.S. PATENT DOCUMENTS

| | | | |
|---|---|---|---|
| 3,868,773 | 3/1975 | Province | 30/130 |
| 3,869,237 | 3/1975 | Hellmer et al. | 425/292 |
| 3,910,144 | 10/1975 | Hess | 83/946 X |
| 3,971,275 | 7/1976 | Mach | 83/140 |
| 3,977,585 | 8/1976 | Sagorski | 225/101 |
| 3,989,786 | 11/1976 | Mehnert et al. | 264/98 |
| 4,037,501 | 7/1977 | Gladow | 83/100 |
| 4,060,366 | 11/1977 | Johansson | 425/290 |
| 4,122,141 | 10/1978 | Krall et al. | 264/89 |
| 4,126,658 | 11/1978 | Rupert et al. | 264/89 |
| 4,173,447 | 11/1979 | Bradbury | 425/526 |
| 4,198,886 | 4/1980 | Bowers et al. | 83/914 X |
| 4,225,303 | 9/1980 | Crisci | 425/525 |
| 4,382,469 | 5/1983 | Bell et al. | 166/248 |
| 4,390,338 | 6/1983 | Bowers et al. | 425/525 |
| 4,397,629 | 8/1983 | Akutsu et al. | 425/525 |
| 4,445,406 | 5/1984 | Thatcher | 82/46 |
| 4,463,637 | 8/1984 | Delio et al. | 83/914 X |
| 4,503,738 | 3/1985 | Morgan | 83/146 |
| 4,545,953 | 10/1985 | Cage et al. | 264/533 |
| 4,578,028 | 3/1986 | Dirksing et al. | 425/525 |
| 4,876,930 | 10/1989 | Thatcher | 82/46 |
| 4,954,071 | 9/1990 | Austin | 425/532 |
| 5,050,787 | 9/1991 | Greene | 83/914 X |
| 5,167,968 | 12/1992 | Dunlap et al. | 425/302.1 |
| 5,188,249 | 2/1993 | Cargile | 215/31 |
| 5,202,135 | 4/1993 | Yawn | 425/527 |
| 5,256,055 | 10/1993 | Morris | 425/527 |
| 5,257,560 | 11/1993 | Palazzolo | 82/46 |
| 5,346,659 | 9/1994 | Buhler et al. | 264/68 |

APPARATUS FOR TRIMMING THE NECK OF BLOW MOLDED PLASTIC BOTTLES AND METHOD

FIELD OF THE INVENTION

The invention relates to an apparatus and method for trimming a plastic ring from the neck of a blow molded plastic bottle to provide a smooth circular sealing surface for engaging the complementary bevel ring of a linerless cap threaded onto the bottle neck.

DESCRIPTION OF THE PRIOR ART

Thin-walled plastic bottles, such as bottles filled with milk, juice, and other liquids, are blow molded with a cylindrical neck, a spiral thread on the neck and a blow dome above the neck. The blow dome is connected to the neck by a radially inwardly extending circumferential groove.

During initial trimming of the blow molded bottle, the blow dome is cut away from the top of the neck at the groove leaving a circumferential flange extending inwardly a short distance from the neck to an inner edge. A pair of opposed V-recesses are formed in the inner flange edge at the parison pinch lines.

Blow molded plastic bottles of the type described are preferably closed by a linerless cap. The cap includes an interior bevel ring which extends into the opening inside the neck flange when the cap is threaded onto the neck. The bevel ring is wedged against interior edge or seal surface of the flange to form a seal closing the bottle. While a linerless cap forms a tight seal against circular portions of the inner edge of the flange, the cap does not seal the two V-recesses extending outwardly from the seal surface at the parison pinch lines.

It is possible to seal a bottle with a neck flange having V-recesses using a cap with a resilient liner in the bottom of the cap so that threading of the cap on the neck compresses the liner against the flange to form the desired seal. However, use of a lined cap undesirably increases the cost of the bottle.

The inner surfaces of plastic bottle neck flanges are conventionally trimmed to remove the V-recesses and form smooth circular seal surfaces permitting use of inexpensive linerless caps. Conventional bottle trimming machines remove the V-recesses by reaming the inner flange surfaces. A rotary reamer is extended into the neck flange and cuts away a circumferential portion of the interior of the neck flange including the V-recesses to form a smooth circular seal surface.

Reaming of the neck flange generates plastic chips in the bottle. These chips must be completely removed from the bottle prior to filling. Removal of chips from the bottle is difficult, and, in the case of a bottle with a handle, nearly impossible.

In addition to providing a smooth seal surface on the neck flange by reaming, it is also conventional to blow mold plastic bottles using a special mold which includes a cylindrical tool positioned below the neck portion oh the mold during molding. The tool is withdrawn outwardly of the neck immediately after blow molding of the bottle to form a smooth cylindrical surface on the interior of the neck suitable for sealing using a linerless cap. Blow molding bottles using this method requires specialized and expensive tooling for each mold. The method is not well adapted for use on high speed multi-mold rotary blow molding machines of the type conventionally used for blow molding thin wall plastic bottles advantageously closed by linerless caps.

SUMMARY OF THE INVENTION

The neck trimming apparatus according to the invention cuts a one piece plastic ring from the flange at the top of a neck in a blow molded bottle using a reverse punch without forming chips. The cut-away ring includes the V-recesses.

Reverse punching removes the ring from the top of the bottle but leaves the ring in an anvil bore and surrounding the punch shaft. The ring is removed from the bore and punch shaft by a specialized ring stripper without forming chips. The stripper includes a ring hook mounted on one side of the shaft above a lead portion of the ring. The hook extends into the interior of the ring and is moved away from the bore and shaft to engage and pull the lead portion of the ring up and away from the anvil base. This movement pulls a trailing portion of the ring against a blade to sever the trailing portion and frees the ring to permit the hook to strip the severed ring out of the anvil bore, past the punch shaft, and out of the neck trimming apparatus. The severed ring is moved into a vacuum manifold. Air flowing through the manifold to a vacuum source entrains the ring and transports the ring to a suitable collection container.

The neck of the bottle is in this way trimmed for closing using a linerless cap by removing a single ring of plastic and discharging the ring away from the bottle without forming plastic chips. The clean cutting and discharge of the ring assures that cut plastic does not collect in the bottle.

Other objects and features of the invention will become apparent as the description proceeds, especially when taken in conjunction with the accompanying drawings illustrating the invention, of which there are six sheets and one embodiment.

DESCRIPTION OF THE PREFERRED EMBODIMENT

Figure 1:
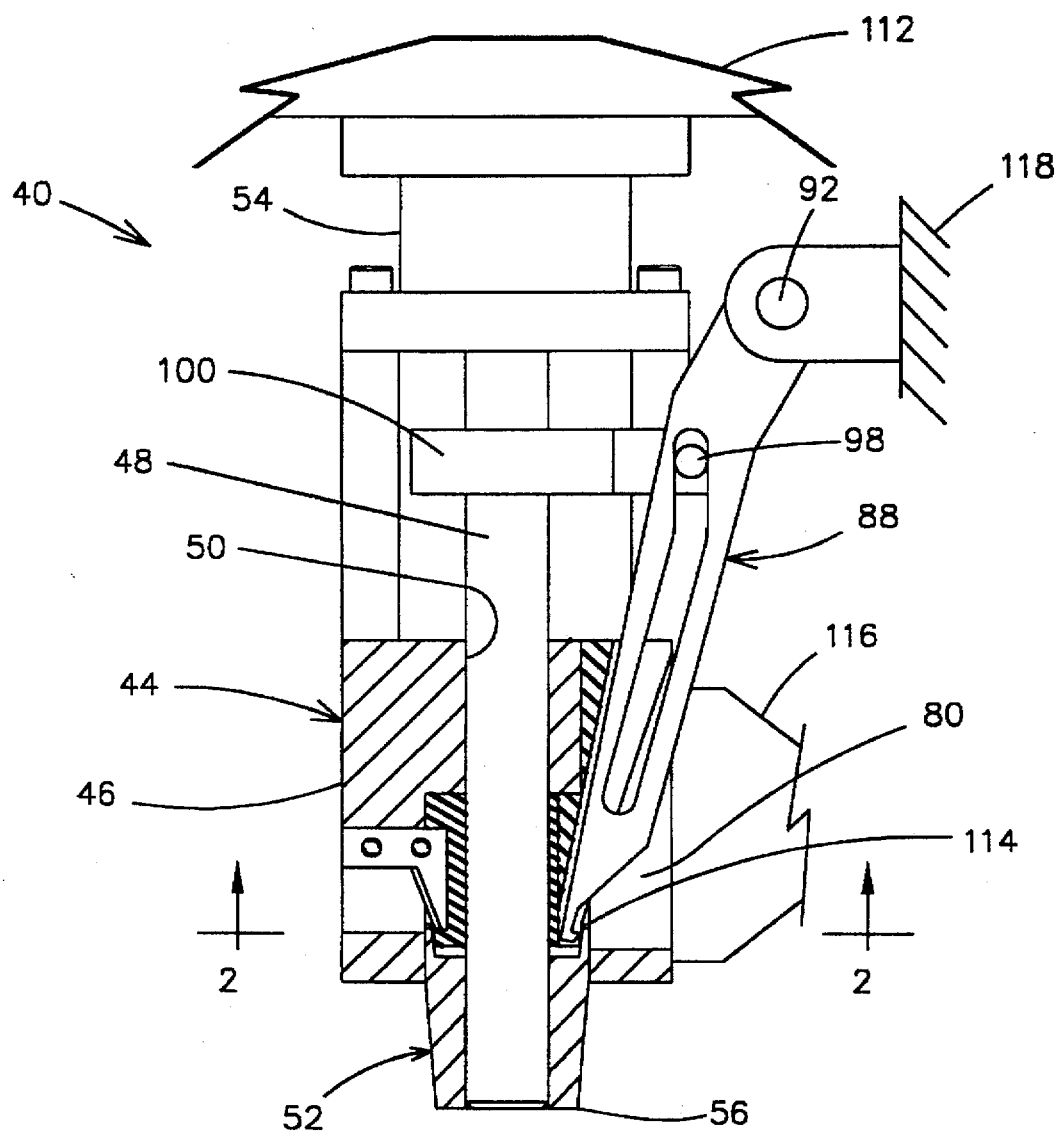
FIG. 1 is a partial vertical sectional view taken through the neck trimming apparatus.
Figure 1:
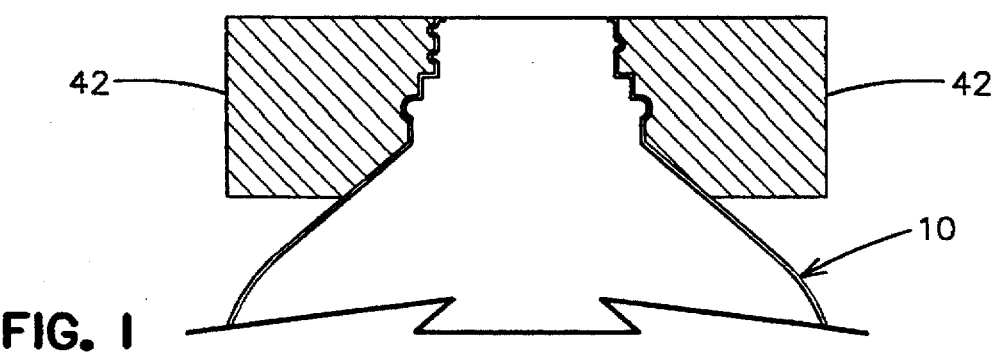

FIGS. 1 through 5 of the drawings illustrate a bottle neck trimming apparatus 40 for trimming a thin ring from the interior circumference of a flange located at the top of plastic bottle 10. The bottle 10 is preferably formed by blow molding and has relatively thin walls approximately 0.025 inches thick. FIGS. 6–9 illustrate the top of the bottle 10 including a cylindrical neck 12 having an exterior thread 14 wrapped around the neck 12. When ejected from the blow molding machine, bottle 10 includes a blow dome 16 joined to the top of the neck 12 at a circular groove 18 extending around the neck 12. During initial trimming of the bottle 10, the blow dome 16 is severed from the neck 12 at the lower wall of the groove 18 so that the bottom of the groove 18 forms a circumferential flange 20 extending inwardly from the top of neck 12. A pair of 180 degree-opposed V-recesses 22 are formed on the inner edge 24 of flange 20. The V-recesses 22 are the consequence of blow molding a bottle having a neck with a diameter less than the diameter of the parison from which the bottle is blow molded. The neck trimming apparatus 40 disclosed herein trims away a narrow ring of plastic from the inner edge 24 of flange 20 along circular trim line 26 located radially outwardly of the V-recess to form a new completely circular inner edge on the flange suitable for forming a tight seal with linerless cap 28.

Figure 9:
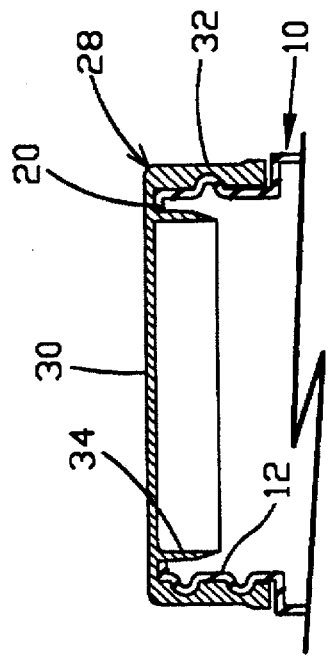
FIG. 9 is a sectional view showing a linerless cap threaded on the neck of the bottle.
Figure 6:
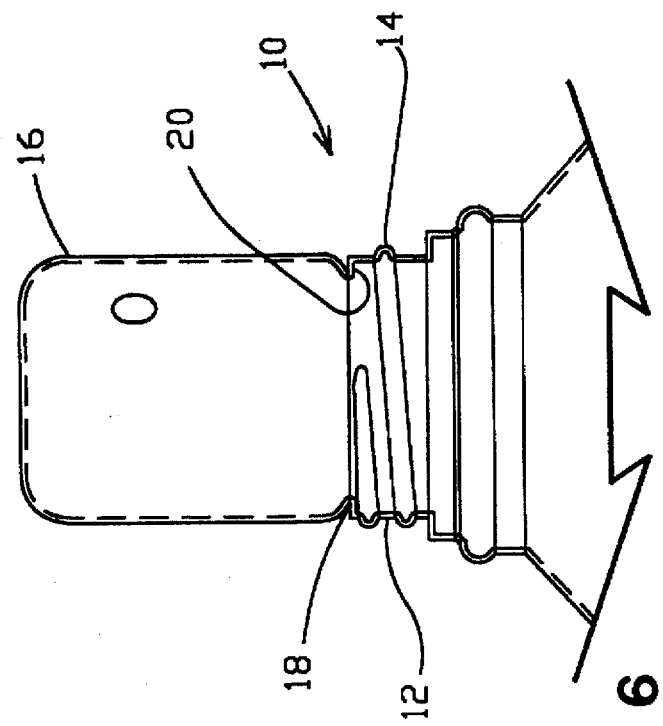
FIG. 6 is a side view of the top of a blow molded bottle.
Figure 2:
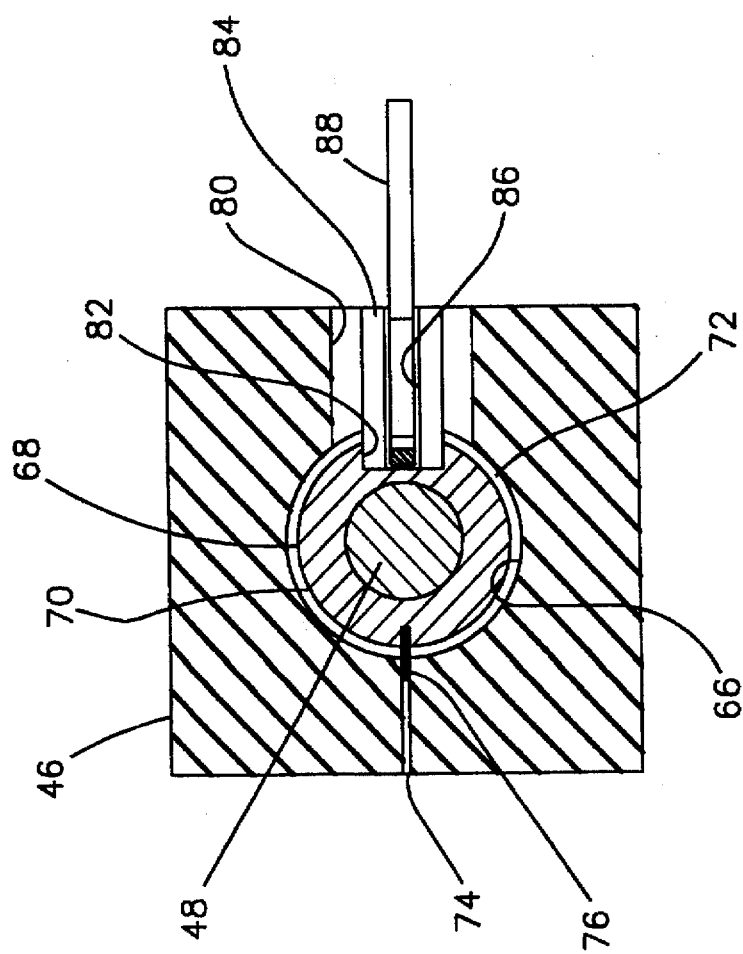
FIG. 2 is a sectional view taken along line 2—2 of FIG. 1.

Linerless cap 28 includes a circular top 30, a cylindrical side 32 joined to the top 30, an interior thread recess engagable with bottle thread 14 and a circular ring 34 having an outwardly facing bevel surface engaging the inner edge 24 of bottle flange 20 to form a tight seal between the bottle 10 and cap 28. The cap 28 is threaded on neck 12 of a trimmed bottle 10 as shown in FIG. 9. Bevel ring 34 tightly seals against the trimmed inner edge of flange 20.

Referring now to FIGS. 1–5, trimming apparatus 40 includes a pair of neck clamp jaws 42 and a suitable drive, not illustrated, operable to open and close the jaws 42 so that the neck 12 of bottle 10 to be trimmed is confined between the jaws 42 with the top of the jaws 42 flush with the top of the bottle neck 12 and flange 20.

Neck trimming apparatus 40 includes a punch assembly 44 having a body 46 with a punch shaft 48 extending vertically through shaft bore 50 formed in the body 46. Reverse punch 52 is mounted on the lower end of punch shaft 48. Shaft drive 54, which may be a power cylinder as illustrated or other suitable type of drive, is mounted on the upper end of the punch shaft 48 and is operable to move the reverse punch 52 between the retracted position shown in FIG. 1 and the extended position shown in FIG. 3. Shaft drive 54 is secured to support 112. A support drive (not illustrated) moves support 112 and punch assembly 44 up and down vertically. Shaft drive 54 is secured to body 46 by bolts and spacers 110.

The reverse punch 52 is symmetrical around the longitudinal axis of the punch shaft 48 and includes a circular, small-diameter lead end 56, a circular large diameter trailing end 58, a sharp circular cutting edge 60 at trailing end 58 and an inwardly tapered or frustoconical portion 62 between ends 56 and 58. An anvil recess 64 is provided inside trailing end 58.

Anvil bore 66 in the lower end of body 46 surrounds the lower end of punch shaft 48 and has a diameter slightly larger than the maximum diameter of reverse punch 52. The reverse punch 52 has a close, sliding fit in the anvil bore 66 when retracted.

Cylindrical insert 68 is press fitted in the upper end of the anvil bore 66 and forms a part of the body 46. The insert defines the lower end of shaft bore 50. The lower end 70 of insert/member 68 is spaced inwardly a distance from anvil bore 66 to provide an annular ring retention space 72 shown in FIGS. 2 and 3. Narrow slot 74 is provided in the side body 46 to the left of the punch shaft 48 as shown in FIG. 1. A continuation of slot 74 is formed in the adjacent side of the insert/member 68. Ring cutting blade 76 is removably mounted in slot 74 and includes an angled cutting edge 78 extending across the ring retention space 72. The cutting edge 78 faces down in space 72 and away from the punch shaft 48 and the opposite side of side body 46.

A wide ring discharge passage 80 is formed in the opposite or right hand side of side body 46 and extends to the anvil bore 66. A narrower vertical stepped slot 82 is formed in the side of cylindrical insert/member 68 adjacent passage 80. A continuation of slot 82 is formed in side body 46 above cylindrical insert 68. The cutting edge 78 of blades 46 faces away from passage 80.

Guide insert 84 is fitted in slot 82 and includes an elongate, angled groove 86 extending from the lower end of the cylindrical insert 68 inside anvil bore 66 to the top of side body 46. Groove 86 opens into annular ring retention space 72 across from blade 76 and into the passage 80.

An elongate hook or ring displacement member 88 includes an upper end 90 pivotally mounted on pin 92 on fixed support 118 and a lower end 94 including ring hook 96. The lower end of member 88 is slidably mounted in groove 86. Drive pin 98 extends outwardly from a support member 100 secured to the punch shaft 48 and is moved with the punch shaft 48. Pin 98 extends into elongate slot 102 formed in the hook member 88 and has a sliding fit in the slot 102. Slot 102 extends generally between the ends of the hook member 88 and includes a short straight upper portion 104 and a lower portion 106. As illustrated, the upper portion 104 is joined to the lower portion 106 at a shallow angle or bend 108 with the concave side of the slot 102 facing the punch shaft 48. Vertical movement of punch shaft 48, either by shaft drive 54 or by the drive for support 112, moves pin 98 along the slot 102. Movement of pin 98 in upper slot portion 104 does not rotate member 88. Movement of pin 98 in lower slot portion 102 rotates the member around pin 92. Drive 54 or the drive for support 112 are operatively connected to ring hook 96 through a member drive connection including shaft 48, support 100, pin 98 and slot 102 in hook or displacement member member 88, and define a hook drive for moving the hook, as will be described. The pin 98 and slot 102 form a pin and follower connection in which the side of the slot moved by the pin is the follower.

A vacuum manifold 116 surrounds passage 80 and is connected to a vacuum source (not illustrated). A ring collection receptacle is located in the manifold to collect cut plastic rings discharged from apparatus 40.

The operation of trimming apparatus 40 will now be described.

FIG. 1 illustrates trimming apparatus 40 at the beginning of a cycle of operation. In this position, a narrow circular ring of plastic 114 cut from the neck 12 of a bottle 10 during the prior cycle of operation is friction-held in the ring retention space 72 between the lower end of the cylindrical insert/member 68 and anvil bore 66. The ring 114 includes a lead portion adjacent passage 80 and a trailing portion adjacent blade 76. Hook 96 on the lower end of member 88 is located in recess 64 formed on the top of the reverse punch inside and a slight distance below the lead portion of plastic ring 114. The trailing portion of the ring 114 is immediately below angled cutting edge 78 of blade 76. A new bottle 10 to be trimmed is held in closed jaws 42 a distance below the retracted neck punch 52 and in axial alignment with the punch. When the apparatus 40 is in this position, the upper slot portion 104 extends vertically, parallel to the axis of the punch shaft.

Figure 3:
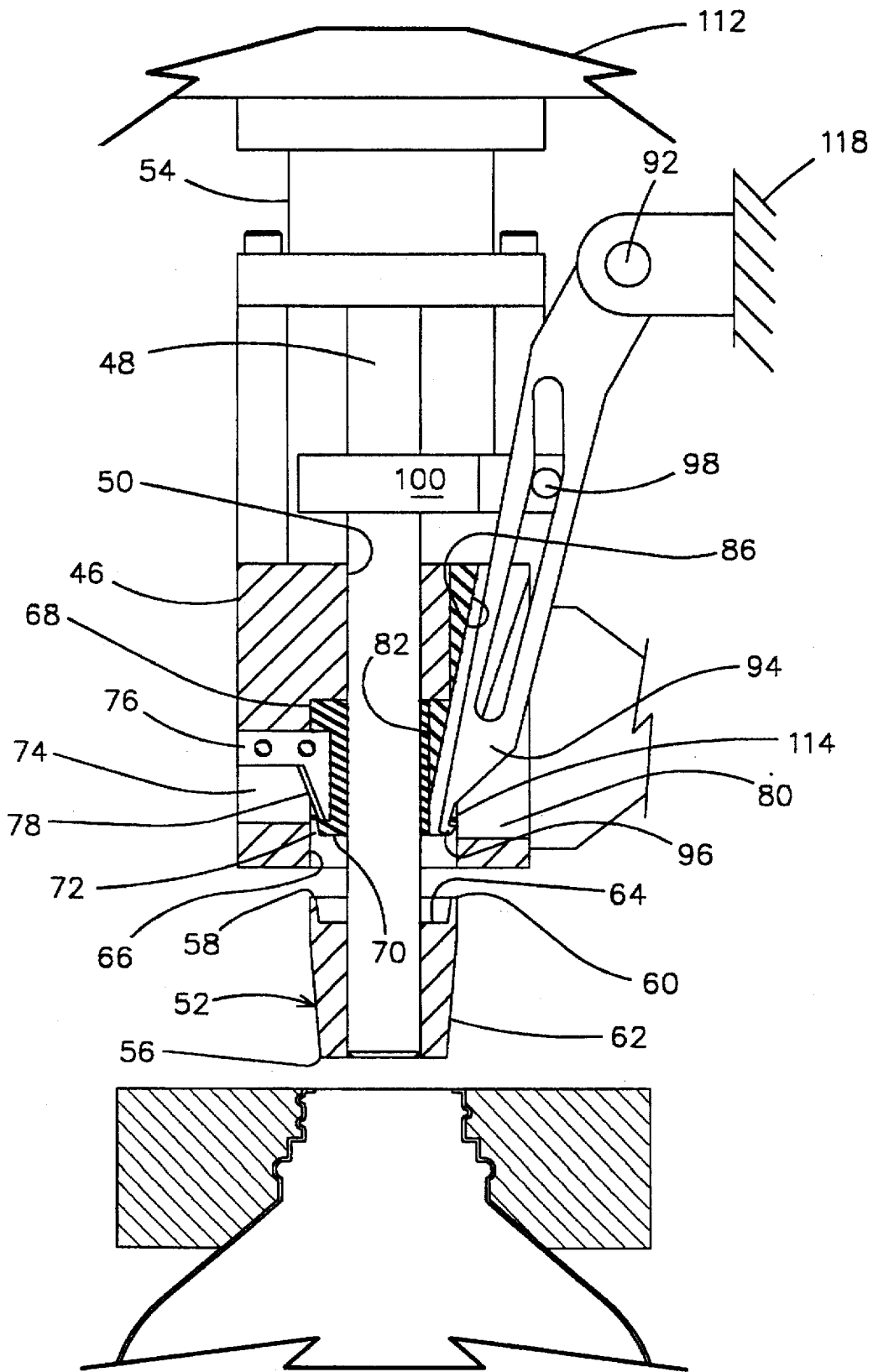
FIGS. 3, 4 and 5 are views similar to FIG. 1 showing operation of the neck trimming apparatus.

Next, the shaft drive 54 is extended to lower the punch shaft and reverse punch to the position of FIG. 3, a distance below the lower end of the punch assembly body 46. Downward movement of the punch shaft moves pin 98 down the upper portion 104 of slot 102 to the bend 108 and a slight distance beyond the bend sufficient to rotate the hook 96 outwardly and under the lead portion of ring 114.

Next, the support 112 is moved down by the support drive (not illustrated) to lower the body 46 and move extended reverse punch 52 toward the bottle 10 held in the clamp jaws. Downward movement of support 112 first pilots the lead end of the reverse punch into the neck opening at the top of the bottle and then moves the frustoconical portion of the punch past the flange. The frustoconical portion flexes the flange downwardly and outwardly during insertion to permit passage of the reverse punch into the interior of the bottle to the position shown in FIG. 4 where the support 112 is fully lowered and the lower anvil face of body 46 rests flush on the top of the clamp jaws. In this position, the inner ring portion of the neck flange extends into the anvil bore 66 and overlies the trailing end 58 of the reverse punch.

During lowering of the body 46 by support 112, pin 98 is moved down the lower portion 106 of slot 102 to thereby pivot the hook member 88 about fixed pin 92 and move the ring hook 96 outwardly in groove 86. When body 46 is bottomed in the position shown in FIG. 4, the hook 96 is located radially outside the upper end of groove 86. During initial movement of the hook relative to the body 46, the hook engages the lead portion of ring 114 and pulls the lead portion of the ring up in the anvil bore and out toward the discharge passage 80, thereby pulling the trailing portion of the ring against the angled cutting edge 78 of blade 76 to sever the trailing portion of the ring. Further downward movement of the body and outward pivoting of the hook strips the severed ring from around the lower insert end 70 and pulls the ring out of the annular space 72 to the position shown in FIG. 4 where the ring is in the upper portion of passage 80 adjacent the inlet mouth of vacuum manifold 116 surrounding passage 80. During this movement, hook 96 extends out from groove 86 to engage and move the lead portion of the ring. Air drawn into the mouth of manifold 116 pulls the severed ring 114 from hook 96 so that the ring is entrained and carried to the collection receptacle.

Figure 4:
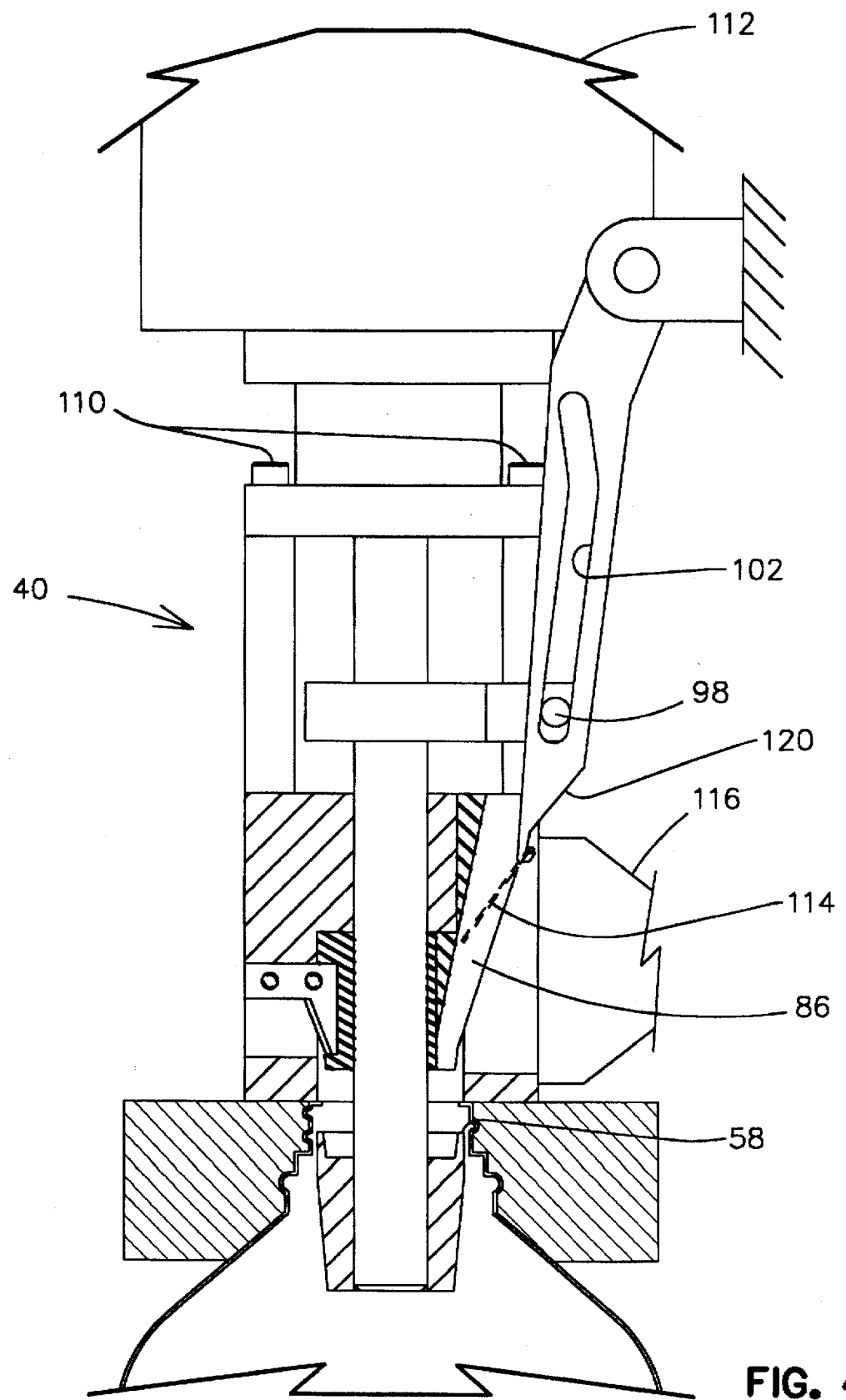
Figure 5:
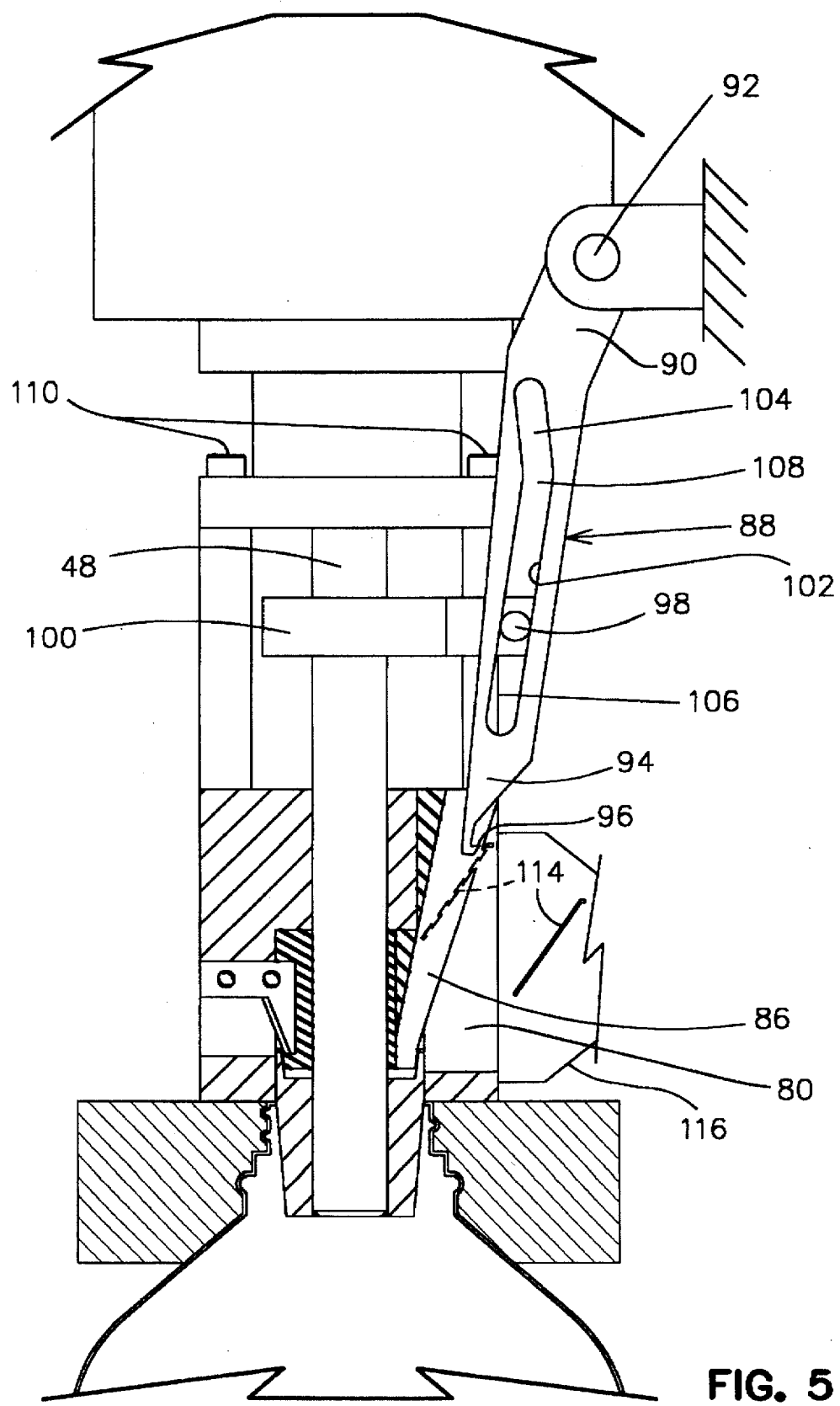
Figure 7:
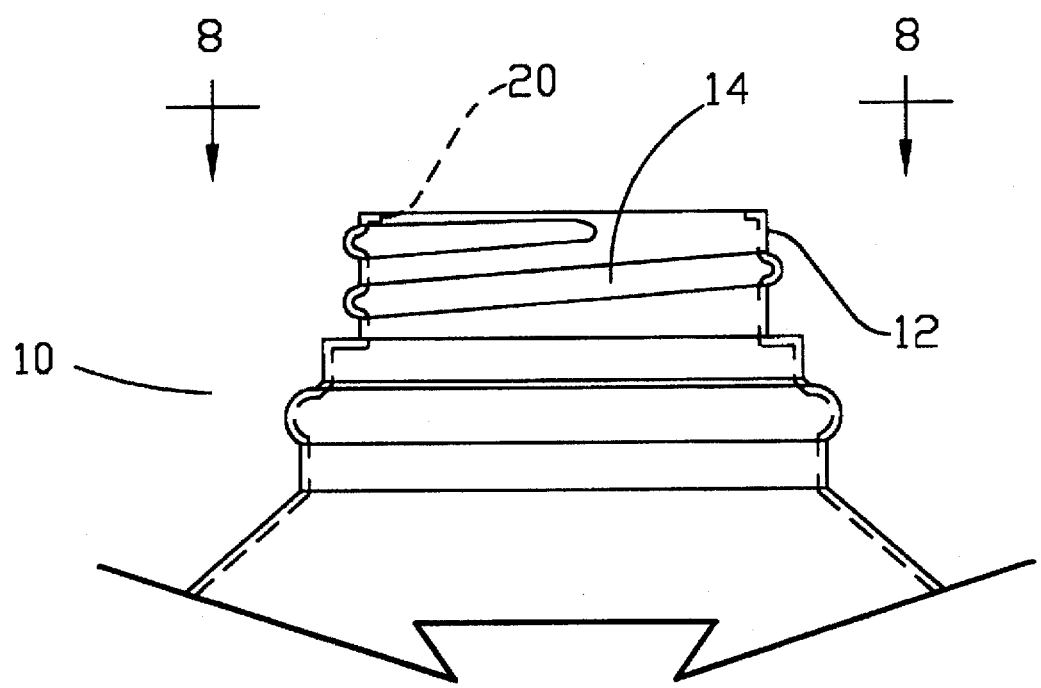
FIG. 7 is a side view of the bottle after trimming away of the blow dome.
Figure 8:
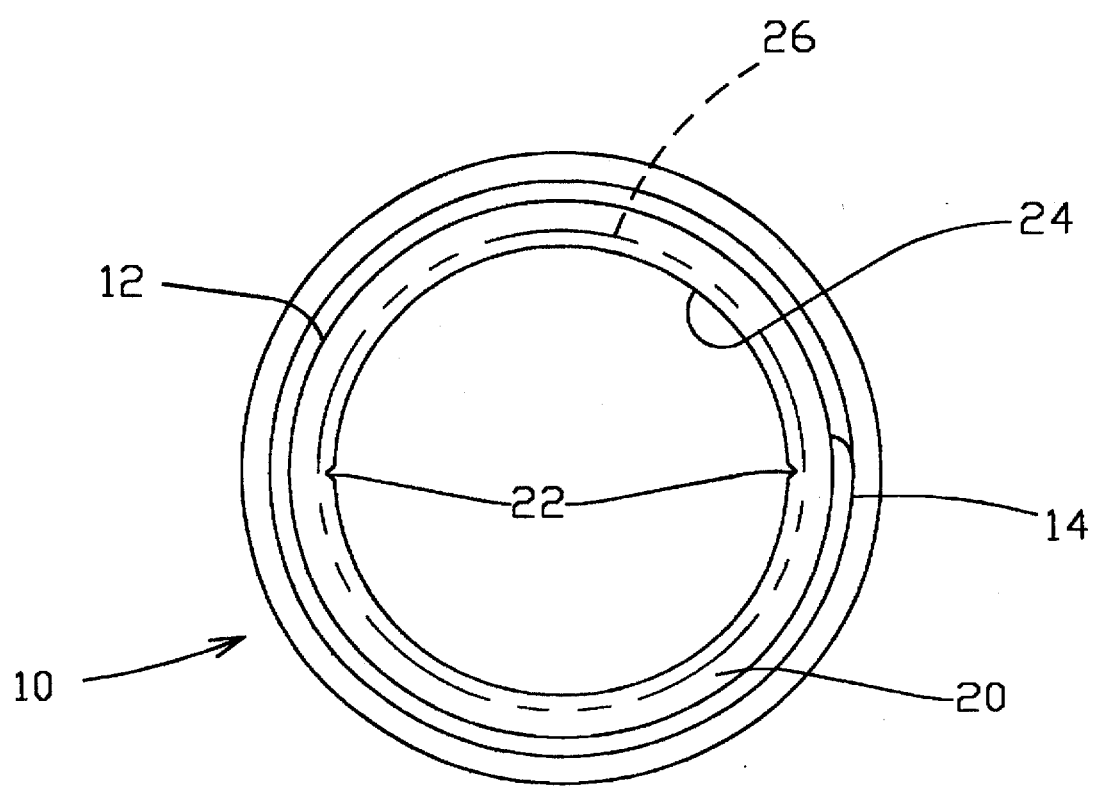
FIG. 8 is a view taken along line 8—8 of FIG. 7.

After lowering of support 112 to the position of FIG. 4, the punch drive 54 is retracted to move the punch shaft and reverse punch from the position of FIG. 4 up to the position of FIG. 5. Upward movement of the trailing end 58 of the punch engages the inner portion of the neck flange of bottle 10 to sever the portion from the flange and form another plastic ring 114. This ring is moved up into the anvil passage to a position as shown in FIG. 5 where the ring is friction-held between the anvil bore and the lower end 70 of insert 68.

Retraction of drive 54 also moves pin 98 up to rotate the hook member 88 about fixed pin 92 toward the punch shaft and move hook 96 out of engagement with the lead end of the previously severed ring and into groove 86. Compare FIGS. 4 and 5. After the hook has been moved out of engagement with the ring, the flattened arms of the ring extending between the lead portion and the severed trailing portion tend to expand and return the ring to its circular shape. This movement, combined with the flow of air past the freed ring and into the vacuum manifold draws the ring from the position shown in dotted lines in FIG. 5 in passage 80 to position shown solid line in the vacuum manifold. The ring is now freed from the trimming apparatus 40 and is transported along the vacuum manifold and deposited in the collection receptacle.

Finally, support 112 is moved up by its drive to return the trimming apparatus to the position of FIG. 1. Vertical movement of the punch shaft moves pin 98 up to the top of slot 102 so that the hook 96 is returned to the position of FIG. 1 in groove 86 and in recess 64 slightly below the lead portion of the newly punched ring 114.

If the ring hangs upon the side of the insert 84, relative movement of the hook member in groove 86 on the next cycle of operation moves cam surface 120 against the ring and frees the ring for discharge.

At this time, jaws 42 are opened to discharge the trimmed bottle 10. A new bottle 10 to be trimmed is positioned between the jaws and the jaws are closed on the bottle to hold the bottle in axial alignment with the reverse punch, thereby completing a full cycle of operation. The next and successive bottles are trimmed by repeating the previously-described cycle of operation.

Ring 114 is cut from the neck of bottle 10 without forming chips and is stripped from the trimming apparatus without forming chips or debris which could collect in the interior of bottle 10.

Trimming apparatus 40 has been described with punch shaft 48 oriented in a vertical position and clamp jaws 42 holding the neck of bottle 10 oriented vertically. Obviously, if desired, the trimming apparatus and clamp jaws may be oriented horizontally so that the punch shaft extends horizontally and the neck of the bottle held in the jaws is oriented horizontally. In this case, the manifold 116 is preferably located on the lower side of body 46 to facilitate discharge of stripped rings 114 to the manifold.

While I have illustrated and described a preferred embodiment of my invention, it is understood that this is capable of modification, and I therefore do not wish to be limited to the precise details set forth, but desire to avail myself such changes and alterations as fall within the purview of the following claims.

What I claim as my invention is:

1. An apparatus for trimming a ring from a neck of a blow molded plastic bottle, the apparatus comprising: a body; a shaft bore extending into the body; an anvil bore at an end of the shaft bore; a punch shaft in the shaft bore, said punch shaft having an end adjacent the anvil bore, a reverse punch on the end of the punch shaft, the reverse punch dimensioned to have a close fit in the anvil bore; a blade on a side of the punch shaft, the blade having a ring edge in the anvil bore; a ring discharge passage in the body on an opposite side of the punch shaft across from the blade, said ring discharge passage extending from the anvil bore to an outer surface of the body; a ring hook on the opposite side of the punch shaft facing outwardly of the anvil bore, the hook having a first position in the anvil bore adjacent the discharge passage and a second position located outside the anvil bore.

2. An apparatus as in claim 1 wherein said reverse punch includes a lead end, a trailing end and a recess in the trailing end adjacent said ring discharge passage.

3. An apparatus as in claim 2 wherein said recess is annular; said trailing end is located on an outer circumference of the reverse punch and includes a cutting edge; and a part of the body is located in anvil bore to define an annular ring retention space, said trailing end fitting within annular ring retention space.

4. An apparatus as in claim 2 including a hook member having a first end forming said ring hook, said hook member extending outwardly from said body, a hook drive, and a member drive connection between the hook drive and the hook member.

5. An apparatus as in claim 4 wherein said hook drive includes the punch shaft.

6. An apparatus as in claim 4 wherein said hook member includes a second end and a pivot connection at said second end.

7. An apparatus as in claim 6 wherein the hook drive includes a pin and follower connection.

8. An apparatus as in claim 4 wherein said ring edge is angled and faces an end of the anvil bore and away from the punch shaft.

9. An apparatus as in claim 1 including a member in the anvil bore, said member having a lower end spaced a distance inwardly from an adjacent end of the anvil bore to define a ring retention space between the anvil bore and the lower end of the member, and said apparatus including a recess in the trailing end of the reverse punch, said trailing end comprising a portion dimensioned to fit within the ring retention space.

10. An apparatus as in claim 9 including a slot in the body adjacent to the ring discharge passage, said slot extending from the lower end of the member outwardly of the body, said ring hook positioned in said slot and in the ring retention space when located in said first position.

11. An apparatus as in claim 10 wherein said discharge passage is larger than said ring hook.

12. An apparatus as in claim 11 including a vacuum manifold surrounding said ring discharge passage; and a vacuum source connected to said vacuum manifold.

13. An apparatus for trimming a ring from a neck of a blow molded plastic bottle, the apparatus comprising: a body; a shaft bore extending into the body; an anvil bore at an end of the shaft bore; a punch shaft in the shaft bore, said punch shaft having an end adjacent the anvil bore; a reverse punch on the end of the punch shaft, said reverse punch having a close fit in the anvil bore; a ring cutting blade in the anvil bore on a side of the punch shaft; a ring discharge passage in the body on an opposite side of the punch shaft extending from the anvil bore to an outer surface of the body; a ring displacement member in the anvil bore between the punch shaft and the ring discharge passage, the displacement member facing the ring discharge passage; and a displacement member drive, a member drive connection joining the displacement member and the displacement member drive, the drive moving the displacement member away from the punch shaft, out of the anvil bore and into the ring discharge passage.

14. An apparatus as in claim 13 including a groove in said body; said ring displacement member located in the groove, said member drive connection joining the displacement member to move the displacement member along the groove.

15. An apparatus as in claim 13 wherein said ring displacement member moves between a first position in the anvil bore and a second position located outwardly of said anvil bore, and said member drive connection moves said ring displacement member from said first position to said second position outwardly of the groove, a portion of said groove being located within said ring discharge passage.

16. An apparatus as in claim 14 wherein the reverse punch includes a trailing end and including a recess in said trailing end.

17. An apparatus as in claim 13 including an annular recess in a trailing end of said reverse punch, the reverse punch also including a circular cutting edge, said body defining an annular ring retention space within the anvil bore, said circular cutting edge dimensioned to fit within said ring retention space.

18. An apparatus as in claim 17 wherein said ring displacement member comprises a hook facing away from the punch shaft.

19. A method of trimming a neck of a plastic blow molded bottle using a reverse punch mounted on a punch shaft, the method including the steps of:

a) extending the reverse punch into the neck of a blow molded plastic bottle;

b) retracting the reverse punch out from the neck of the bottle to cut a ring of plastic from the neck of the bottle in a single piece and position the trimmed ring on the punch shaft free from the bottle;

c) moving a lead portion of the ring to a side of the punch shaft to pull a trailing portion of the ring against a blade and cut the trailing portion of the ring while retaining the ring in a single piece; and d) further moving the lead portion of the ring to the side of the punch shaft to pull the cut trailing portion of the ring to the side of the punch shaft and strip the ring from the punch shaft in a single piece.

20. The method of claim 19 including the step of:

e) retracting the reverse punch, moving the lead portion, and further moving the lead portion without forming plastic chips.

21. The method of claim 19 including the step of:

f) positioning a ring displacement member inside of the lead portion of the ring and then moving the member against the lead portion and away from the punch shaft.

22. The method of claim 21 including the step of:

g) positioning the ring displacement member within a recess in a trailing end of the reverse punch.

23. The method of claim 22 including the step of:

h) friction retaining the punched ring on the punch shaft.

24. The method of claim 22 including the step of:

i) friction retaining the punched ring in an annular recess.

25. The method of claim 19 including the step of:

j) entraining the stripped ring in a gas flow to move the ring away from the punch shaft.

* * * * *